Dec. 14, 1937.  J. KYLSTRA  2,102,325
AIRPLANE CONTROL ROD AND METHOD OF MAKING THE SAME
Filed June 9, 1936
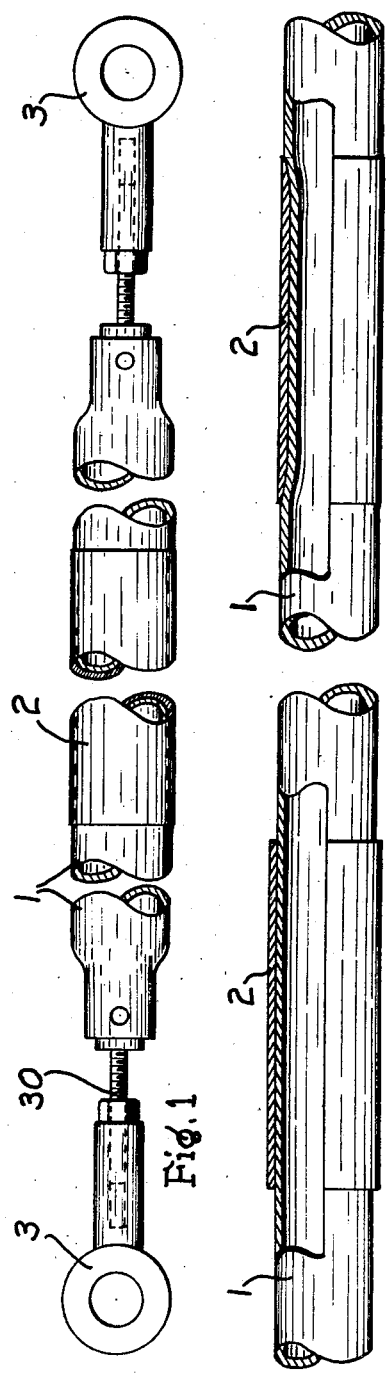
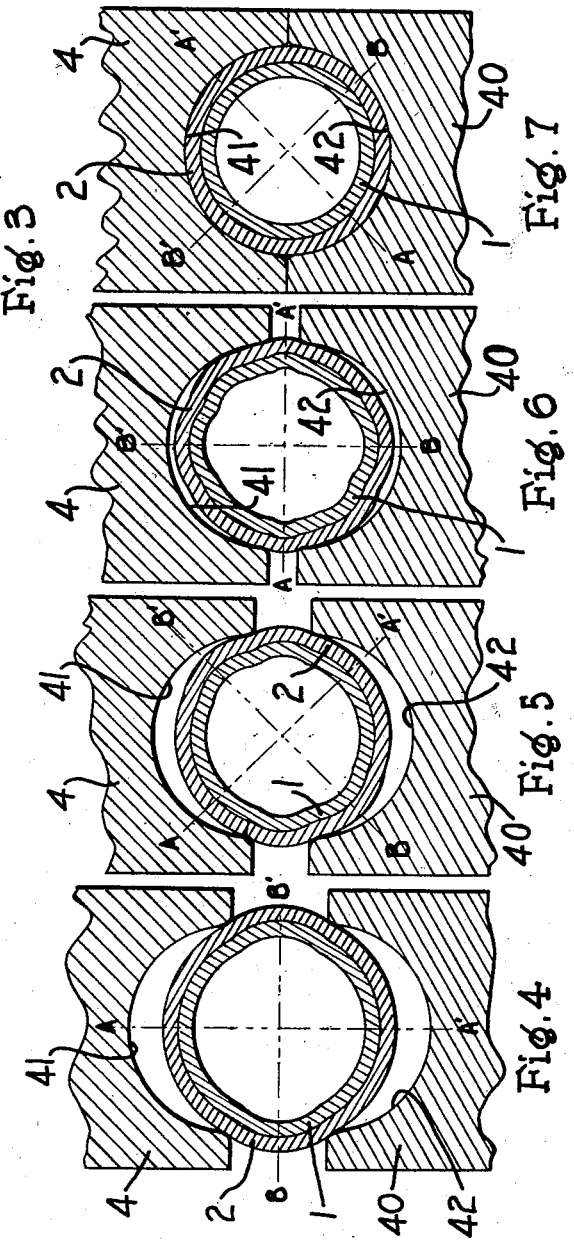
Inventor
John Kylstra
By Charles L. Reynolds
Attorney Patented Dec. 14, 1937

2,102,325

UNITED STATES PATENT OFFICE 2,102,325

AIRPLANE CONTROL ROD AND METHOD OF MAKING THE SAME

John Kylstra, Seattle, Wash., assignor to Boeing Aircraft Company, Seattle, Wash., a corporation of Washington Application June 9, 1936, Serial No. 84,284

7 Claims. (Cl. 29—148.2)

My invention relates to airplane control rods and like members. Such control rods are used in push-pull control systems, as for example in operating an aileron, rudder or elevator, or a tab mounted thereon, or in engine controls. They must be light, and must be strong. They are normally guided in suitable guides or fair-leaders disposed between their ends, so that they will function properly and will not buckle, for at times there is considerable stress placed upon them.

It has been customary heretofore to use aluminum alloy tubes for such control rods, they being light and strong. For control rods transmitting any considerable force, as large a diameter of tube should be used as space and weight requirements will permit. Aluminum alloys, such as Duralumin, however, do not wear to compare with steel when in frictional contact with a guide or fair-leader, such as are commonly used in such control systems, and it becomes necessary to provide a wearing surface, as a steel sleeve, at the point where the greatest wear occurs. If a steel sleeve is slipped upon the aluminum alloy tube to take the wear, it is difficult to secure it in place by flush rivets, bolts, or any convenient means, and the increased size of the tube at the fair-leader, plus the larger size of fair-leader thereby entailed, not only adds to the weight but not infrequently exceeds the available space. It weakens the aluminum alloy control rod if its diameter is lessened to avoid the difficulties mentioned, and in some cases the expedient has been adopted of severing the aluminum alloy tube and inserting, between its ends, a steel tube of slightly greater diameter. This, however, introduces points of weakness at each joint, and is therefore objectionable.

Accordingly, it is an object of my invention to provide a bearing or wearing surface such as a steel sleeve on a control tube of metal softer than a metal guide in a way which will but slightly, if at all, increase the diameter of the complete tube over that of the original control tube, which will not require the employment of rivets or any securing means, and which will preserve the control tube continuous and unbroken and which will weaken the complete tube but little or not at all.

A further object is to provide a method whereby such a control rod may be manufactured quickly, conveniently, and at low cost.

My invention comprises the novel control rod, and the novel method of making the same, as shown in the accompanying drawing, and as will be hereinafter more particularly disclosed and defined.

Figure 1 is an elevation of the control rod, ready for use.

Figure 2 is a part elevation and part section of the sheathed tube, in position in accordance with the first step of my process, and Figure 3 is a similar view showing the parts in the position at the close of the process.

Figure 4 is a transverse section through the Duralumin sheathed tube and swaging dies in the performance of the first stage of the second step of the process, and Figures 5, 6 and 7 are similar views of successive stages, Figure 7 illustrating the final stage of the process.

The control rod includes an aluminum alloy tube 1 which is continuous from end to end, and which is provided at its end with fittings 3 each including a means 30 whereby the overall length of the rod may be varied. The fittings 3 are standard in size and design, and enable the rod to be connected in the control system to operating members and to members to be operated upon.

In the formation of this control rod, in which, as noted above, the aluminum alloy tube 1 is continuous from end to end, a bearing sleeve 2 is slid lengthwise along the rod. Ordinarily, this sleeve would have an inside diameter just enough larger than the outside diameter of the tube 1 to afford a good sliding fit. It might, however, be somewhat larger. Accordingly, as the first step of the process, the steel sleeve 2 is slid lengthwise of the tube 1 to the desired final position intermediate its ends. It is then placed between a pair of swaging dies 4 and 40, which are provided with complementary semi-cylindrical recesses 41 and 42, respectively, slightly relieved at the corners, and of the final size desired for the steel sleeve. The dies are brought together and tend to squeeze down the sleeve, and with it the tube inside, as indicated in Figure 4. The dies then separate, and before they close again the tube and sleeve are rotated part way about their common axis, as may be observed by comparison of the axes A, A' and B, B' in Figures 4 and 5, and as the dies 4 and 40 come together again a further compression occurs in a different location. This is continued, the dies recurrently opening and closing, and the tube and sleeve being rotated about their common axis prior to each closing of the dies, until finally they are worked or swaged down so that the steel sleeve 2 becomes of approximately the outside diameter of the aluminum alloy tube beyond the ends of the sleeve, and the peripheries of the tube 1 and sleeve 2 lie substantially in a common cylinder, which relationship I have termed "co-cylindrical". That portion of the tube 1 which lies within the length of the steel sleeve is likewise swaged down, but still remains continuous with and an integral part of the main control tube 1.

The steel sleeve now serves as protection for the softer aluminum alloy tube, and because the latter is swaged down, the bearing sleeve cannot slide lengthwise of the tube, but is fixed in place, yet no securing means, as such, are required.

As is customary where two parts made of different metals contact, a thin film of aluminum foil will ordinarily be placed between the sleeve and the tube, to prevent electrolytic action between them, but this in itself is not a part of my invention, being a matter of common practice.

What I claim as my invention is:

1. A control rod which is to be guided by a metal guide, comprising a metal sleeve for bearing contact with the guide, and a single unbroken metal tube, softer than such guide but capable of transmitting torque and tension and compression stresses, passing through said bearing sleeve, and having a circumferential recess below its general periphery and inwardly from each end wherein said sleeve is received and held against lengthwise movement relative to the tube.

2. A control rod which is to be guided by a metal guide, comprising a bearing sleeve of metal substantially equal in hardness to the metal guide, and a single unbroken tube of metal softer than such guide and said sleeve but capable of transmitting torque and tension and compression stresses, passing through said sleeve and having a circumferential recess below its general periphery and inwardly from each end to receive said bearing sleeve with its periphery disposed substantially cocylindrical with the periphery of said tube beyond each sleeve end, and with the ends of the sleeve engaged with the ends of the recess to prevent axial movement of the sleeve relative to the tube.

3. A control rod which is to be guided by a metal guide, comprising a bearing sleeve of metal substantially equal in hardness to the guide, a single unbroken tube of metal softer than the guide and said sleeve but capable of transmitting torque and tension and compression forces, said tube having a swaged constricted portion between its ends and passing through said sleeve, and closely received therein to dispose the periphery of said sleeve substantially cocylindrical with the periphery of said tube beyond each sleeve end, and means engaging the ends of said tube at each side of said sleeve to transmit stress thereto.

4. A control rod which is to be guided by a guide, comprising a steel sleeve for bearing contact with the guide, and a single unbroken tube of aluminum alloy, capable of transmitting torque and tension and compression stresses, received closely within and swaged to engage the ends of said sleeve to prevent movement thereof lengthwise along said tube, and to dispose the periphery of said sleeve substantially cocylindrical with the periphery of said tube beyond each sleeve end.

5. An operating control rod, consisting of a seamless bearing sleeve of steel, and a single continuous, unbroken tube of aluminum alloy for connection in a push-pull control system passing through said sleeve and projecting beyond both ends thereof, and of an outside diameter approaching that of said sleeve and greater than the sleeve's inside diameter, and said sleeve and tube being swaged whereby the sleeve fits closely about the tube, and the tube engages both ends of the sleeve to prevent movement of the sleeve lengthwise of the tube.

6. A method of constructing composite tubes, which comprises sliding a short sleeve lengthwise over a long tube into a position between the ends of the latter, from opposite sides of the sleeve applying thereto a slight swaging force over its entire length, from opposite sides of the sleeve spaced angularly from the sides from which the next previous force was applied again applying thereto a slight swaging force over its entire length, and from successively angularly spaced opposite sides of the sleeve recurrently applying thereto such slight swaging forces over its entire length, to swage the sleeve and that portion of the tube lying immediately therebeneath uniformly inwardly to the desired smaller diameter.

7. A control rod, for use in aircraft, consisting of a continuous unbroken member of appropriate length and having a constricted portion between its ends, of light but soft metal, fittings connected to the ends of said member, and a sleeve surrounding and closely fitted to the constricted portion only of said member, the ends whereof are spaced inwardly of the ends of said member, said sleeve being of harder but heavier metal, whereby it is adapted to resist wear when engaged with a guide or bearing.

JOHN KYLSTRA.